United States Patent
Awai et al.

(10) Patent No.: US 7,540,628 B2
(45) Date of Patent: Jun. 2, 2009

(54) ILLUMINATED PANELS AND METHODS THEREFOR

(75) Inventors: George K. Awai, Danville, CA (US); Michael D. Ernst, Alamo, CA (US)

(73) Assignee: Novicomm, Inc., Alamo, CA (US)

( * ) Notice: Subject to any disclaimer, the term of this patent is extended or adjusted under 35 U.S.C. 154(b) by 31 days.

(21) Appl. No.: 11/550,213

(22) Filed: Oct. 17, 2006

(65) Prior Publication Data

US 2007/0247873 A1    Oct. 25, 2007

Related U.S. Application Data

(63) Continuation-in-part of application No. 11/379,967, filed on Apr. 24, 2006, now abandoned.

(51) Int. Cl.
*F21V 5/00* (2006.01)
(52) U.S. Cl. .............. 362/227; 362/612; 362/800; 362/613
(58) Field of Classification Search ............... 362/612, 362/613, 812, 800
See application file for complete search history.

(56) References Cited

U.S. PATENT DOCUMENTS

| | | | |
|---|---|---|---|
| 1,584,967 A | | 5/1926 | Andresen |
| 3,892,959 A | * | 7/1975 | Pulles ............... 362/613 |
| 4,729,067 A | | 3/1988 | Ohe |
| 4,965,950 A | * | 10/1990 | Yamada ............... 40/546 |
| 5,040,098 A | | 8/1991 | Tanaka et al. |
| 6,005,649 A | | 12/1999 | Krusius et al. |
| 6,332,690 B1 | | 12/2001 | Murofushi |
| 6,824,285 B2 | | 11/2004 | Saitoh et al. |
| 6,935,764 B2 | * | 8/2005 | Choi et al. ............... 362/326 |
| 6,969,188 B2 | * | 11/2005 | Kuo ............... 362/613 |
| 6,971,758 B2 | | 12/2005 | Inui et al. |
| 7,067,188 B1 | | 6/2006 | Yang et al. |
| 2002/0140880 A1 | | 10/2002 | Weindorf et al. |
| 2003/0072147 A1 | | 4/2003 | Pashley et al. |
| 2004/0062028 A1 | | 4/2004 | Winston et al. |

(Continued)

OTHER PUBLICATIONS

"PCT International Search Report and Written Opinion of the International Searching Authority, or the Declaration", Application No. PCT/US 08/01430, mailed Jun. 10, 2008.

(Continued)

*Primary Examiner*—Anabel M Ton
(74) *Attorney, Agent, or Firm*—Kang S. Lim

(57) ABSTRACT

A system for illuminating panels such as advertising display panels is provided. Such illuminated panels include at least one row of point light sources located substantially within the at least one illuminated frame member, a diffusion layer have a diffusion edge facing the at least one row of point light sources, a backscattering layer coupled to a back surface of the diffusion layer, and a dispersion layer coupled to a front surface of the diffusion layer. The diffusion layer has an edge with a surface roughness configured to diffuse light emitted by the at least one row of point light sources. In some embodiments, the light sources are dimmable Luxeon LEDs and can be activated by an infrared sensor. It is also possible to use ultraviolet to blue light sources for the panel and to include a phosphor in the dispersion layer of the panel for converting the ultraviolet to blue light into visible light.

20 Claims, 8 Drawing Sheets

U.S. PATENT DOCUMENTS

| | | |
|---|---|---|
| 2004/0130882 A1 | 7/2004 | Hara et al. |
| 2005/0092469 A1 | 5/2005 | Huang |
| 2005/0174780 A1 | 8/2005 | Park |
| 2005/0201118 A1 | 9/2005 | Godo |
| 2005/0212397 A1 | 9/2005 | Murazaki et al. |
| 2005/0259424 A1 | 11/2005 | Zampini et al. |
| 2006/0021267 A1 | 2/2006 | Matsuda et al. |
| 2007/0109788 A1 | 5/2007 | Pan |
| 2007/0127261 A1 | 6/2007 | An et al. |
| 2007/0245607 A1 | 10/2007 | Awai et al. |
| 2007/0247831 A1 | 10/2007 | Buelow, II et al. |
| 2008/0002428 A1 | 1/2008 | Byun et al. |
| 2008/0074881 A1 | 3/2008 | Liaw |
| 2008/0186695 A1 | 8/2008 | Awai et al. |
| 2008/0186696 A1 | 8/2008 | Awai et al. |
| 2008/0186732 A1 | 8/2008 | Awai et al. |
| 2008/0186737 A1 | 8/2008 | Awai et al. |

OTHER PUBLICATIONS

"Arkema Awarded Patent for Key Innovation Behind Plexiglas® Frosted Acrylic Sheet and Resin Products", Press Release: Atofina Chemicals, Inc., Aug. 16, 2006.

"Novicomm Investor Update", Novicomm, Inc., Dec. 1, 2007.

"LED Lighting in Freezer Cases", Field Test DELTA Shapshots, Issue 2; Rensselaer Polytechnic Institute, Dec. 2006.

"Acrylic Manufacturers on B2BManufacturers.Com from China and Taiwan", http://www.manufacturers.com.tw/industrial-supply/acrylic-manufacturers.html, G.T. Internet Information Co., Ltd.; 10 pages, 2007.

"Arkema Awarded Patent for Plexiglas® Frosted Acrylic Sheet and Resin Products", http://www.plasticsmag.com/lbn.asp?fissue=sep/oct-06, Plastics Distributor® & Fabricator Magazine, 2008.

"Plaskolite Frosted Acrylic Sheet", http://www.plaskolite.com/ofrost.htm, Plaskolite, Inc., 2003.

* cited by examiner

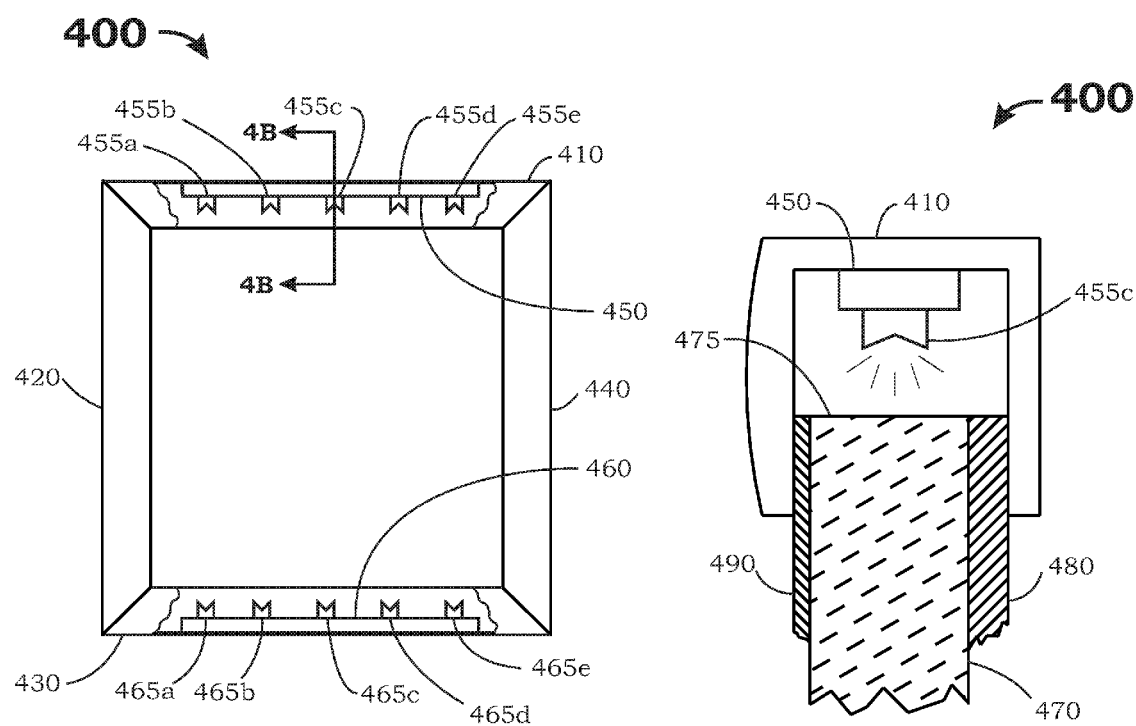

ILLUMINATED PANELS AND METHODS THEREFOR

CROSS REFERENCE TO RELATED APPLICATIONS

This is a continuation-in-part of co-pending U.S. application Ser. No. 11/379,967 filed Apr. 24, 2006, entitled "System and Methods for Illuminating Panels", which is hereby fully incorporated by reference.

BACKGROUND OF THE INVENTION

This invention relates generally to illuminating panels. More particularly, this invention relates to cost effective systems and methods for using multiple point light sources such as light emitting diodes (LEDs) to illuminate panels.

Illuminated panels have many uses where evenly lit panels with neutral color temperature are used including advertising display panels, shopping mall directories, restaurant menus, event schedules, and navigational signboards. Other uses for illuminated panels include light-boxes for artists, photographers, architects, design engineers, general contractors and draftsmen.

These illuminated panels can be as small as six inches by six inches, and as large as four feet by eight to ten feet or more. Depending on their specific applications, weight, cost, panel thickness, and lamp-life, can all be crucial to the successful design, manufacture and marketing of these panels. In addition, environmental requirements such as vibration/shock resistance, impact resistance, operating temperature range, ease of maintenance and power consumption can also be important.

Fluorescent light tubes are used in most commercially available illuminated displays because of the inherent evenness of light output due to the tube's physical configuration. In addition, fluorescent lamp-life is significantly longer than incandescent bulbs, and fluorescent lights also consume significantly less power for the same light output. While fluorescent tubes are better than incandescent bulbs for illuminating panels, they also have many disadvantages including overall size and weight of the power supply, and fragility of the glass tube. For example, because most illuminated panels are less than one-half of an inch thick, the fluorescent tubes have to be equally skinny and very fragile. Accordingly, the fluorescent tubes are easily damaged during manufacture, transportation and installation.

In addition, although fluorescent tubes have longer lamp-life than incandescent bulbs, fluorescent tubes have a tendency to flicker depending on the frequency of the driving voltage. The light output of fluorescent tubes is also not easily adjusted to match ambient light conditions. Ballasts are also required for operation of the fluorescent tubes. Fluorescent tubes are also inefficient when operated under low temperatures.

There are also other disadvantages inherent with using single light sources, the most common of which are fluorescent tubes. Since fluorescent tubes are easily damaged when subjected to shock, when the single fluorescent tube fails, an entire side of the panel is not longer illuminated.

Previous attempts at replacing fluorescent tubes with point lights sources have failed because point light sources produce a "saw-tooth" effect in the light pattern. It is therefore apparent that an urgent need exists for improved illuminated panels using point light sources that are easy to manufacturer, easy to maintain, shock resistant, impact resistant, portable, cost effective, and have long lamp-life.

SUMMARY OF THE INVENTION

To achieve the foregoing and in accordance with the present invention, systems and methods for illuminating panels such as advertising display panels are provided. Such illuminators can be operated very efficiently, cost-effectively and with minimal maintenance once installed in the field.

In one embodiment of the invention, the illuminated panels include at least one row of point light sources located substantially within the at least one illuminated frame member, a diffusion layer have a diffusion edge facing the at least one row of point light sources, a backscattering layer coupled to a back surface of the diffusion layer, and a dispersion layer coupled to a front surface of the diffusion layer. The diffusion layer has an edge with a surface roughness configured to diffuse light emitted by the at least one row of point light sources.

In some embodiments, the light sources are dimmable Luxeon LEDs and can be activated by an infrared sensor so that the panel is appropriately illuminated when a potential viewer is in range, thereby conserving power.

Since LEDs are not operating most efficiently when emitting white light, it is also possible to use ultraviolet to blue light sources for the panel, and to include a phosphor in the dispersion layer of the panel for converting the ultraviolet to blue light into visible light.

These and other features of the present invention will be described in more detail below in the detailed description of the invention and in conjunction with the following figures.

BRIEF DESCRIPTION OF THE DRAWINGS

In order that the present invention may be more clearly ascertained, one embodiment will now be described, by way of example, with reference to the accompanying drawings, in which:

FIG. 4A is a front view of another embodiment of the invention;

FIG. 4B is a cross-sectional view 4B-4B of FIG. 4A;

DETAILED DESCRIPTION OF THE INVENTION

The present invention will now be described in detail with reference to several embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

Figure 1A:
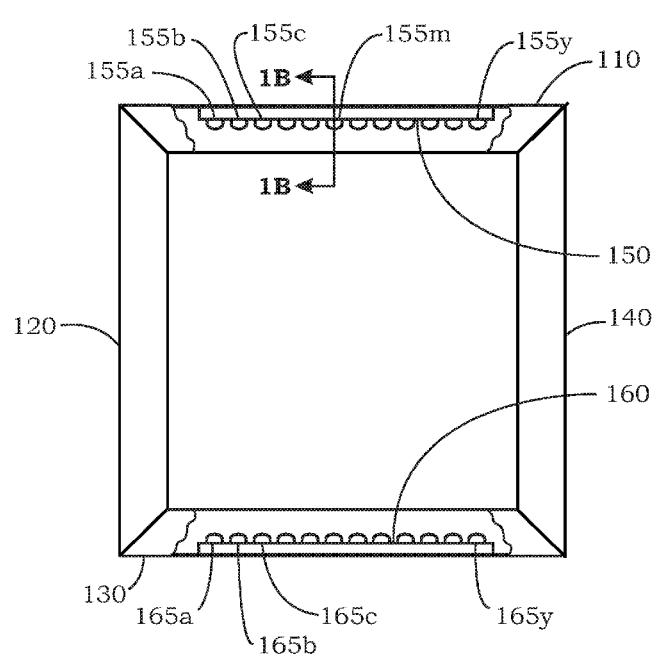
FIG. 1A is a front view of one embodiment of the present invention.

FIG. 1A is a front view showing one embodiment of an illuminated panel 100 in accordance with the present invention. Panel 100 includes frame members 110, 120, 130, 140. To facilitate discussion, the front portion of top frame member 110 and the front portion of bottom frame member 130 have cutaways exposing a top row of point light sources 155a, 155b, 155c . . . 155y and a bottom row of point light sources 165a, 165b, 165c . . . 165y, respectively.

The top row of point light sources 155a, 155b, 155c . . . 155y are mounted a light base 150 which functions as a mounting support and also as means for providing power and control to light sources 155a, 155b, 155c . . . 155y. Similarly, the bottom row of point light sources 165a, 165b, 165c . . . 165y are mounted a light base 160 which functions as a mounting support and also as means for providing power and control to light sources 165a, 165b, 165c . . . 165y. Depending on the overall panel dimensions and cost, weight, and/or power constraints of panel 100, one member, two members (as shown in this example), three members or all four members of frame members 110, 120, 130, 140 can be illuminated. In addition, power and control circuitry for panel 100 can either be internal, external, or combinations thereof, with respect to frame members 110, 120, 130, 140.

In this embodiment, point light sources 155a, 155b, 155c . . . 155y and 165a, 165b, 165c . . . 165y can be low-wattage light emitting diodes (LEDs) commercially available from www.nichia.com, www.cree.com or www.lumileds.com. LEDs 155a, 155b, 155c . . . 155y and 165a, 165b, 165c . . . 165y are spaced about one-quarter of an inch apart from each other, resulting in about forty-eight LEDs per linear foot of light bases 150, 160, respectively. Each LED consumes about 20 mA and emits about 5 candela of visible light. LEDs 155a, 155b, 155c . . . 155y and 165a, 165b, 165c . . . 165y can be powered and controlled using commercially available constant-current power supplies, e.g., M/W model number TSU 66A-3 which provides 12V DC @5.5 A, or MWS model number 122500UC which provides 12V DC @250 mA. Another manufacturer of DC power supplies is XP Power (www.xpplc.com).

Figure 1B:
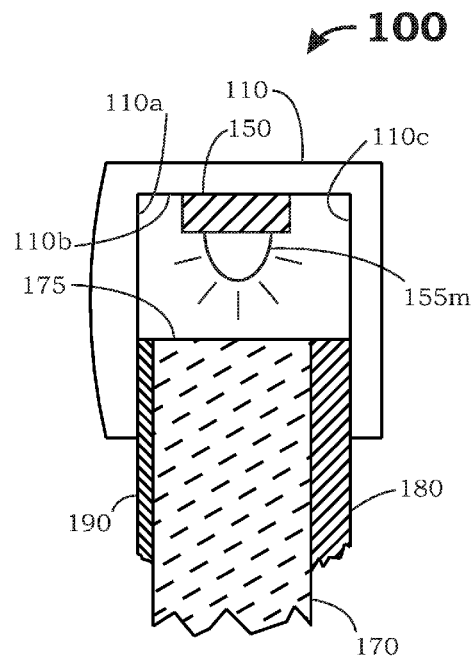
FIG. 1B is a cross-sectional view 1B-1B of FIG. 1A.

FIG. 1B is a cross-sectional view 1B-1B of panel 100 showing top frame member 110, light source 155m attached to light base 150, and an illuminated display comprising a transparency 190, a diffusion layer 170 and a back-scattering layer 180. Transparency 190 can be merely in contact with diffusion layer 170 so that transparency 190 can be easily replaced by a new or different transparency. Alternatively, transparency 190 can be permanently attached to diffusion layer 170 using a suitable adhesive or process.

Diffusion layer 170 can be made from acrylic or another suitable plastic or polymer with the required light transmitting properties available from Mitsubishi. Back-scattering layer 180 can be made from a suitable highly reflective polymer such as Styrene or vinyl, available from 3M Corporation. Back-scattering layer 180 can either in contact with diffusion layer 170, or back-scattering layer 180 can be permanently bonded to diffusion layer 170 by a suitable adhesive.

Figure 1C:
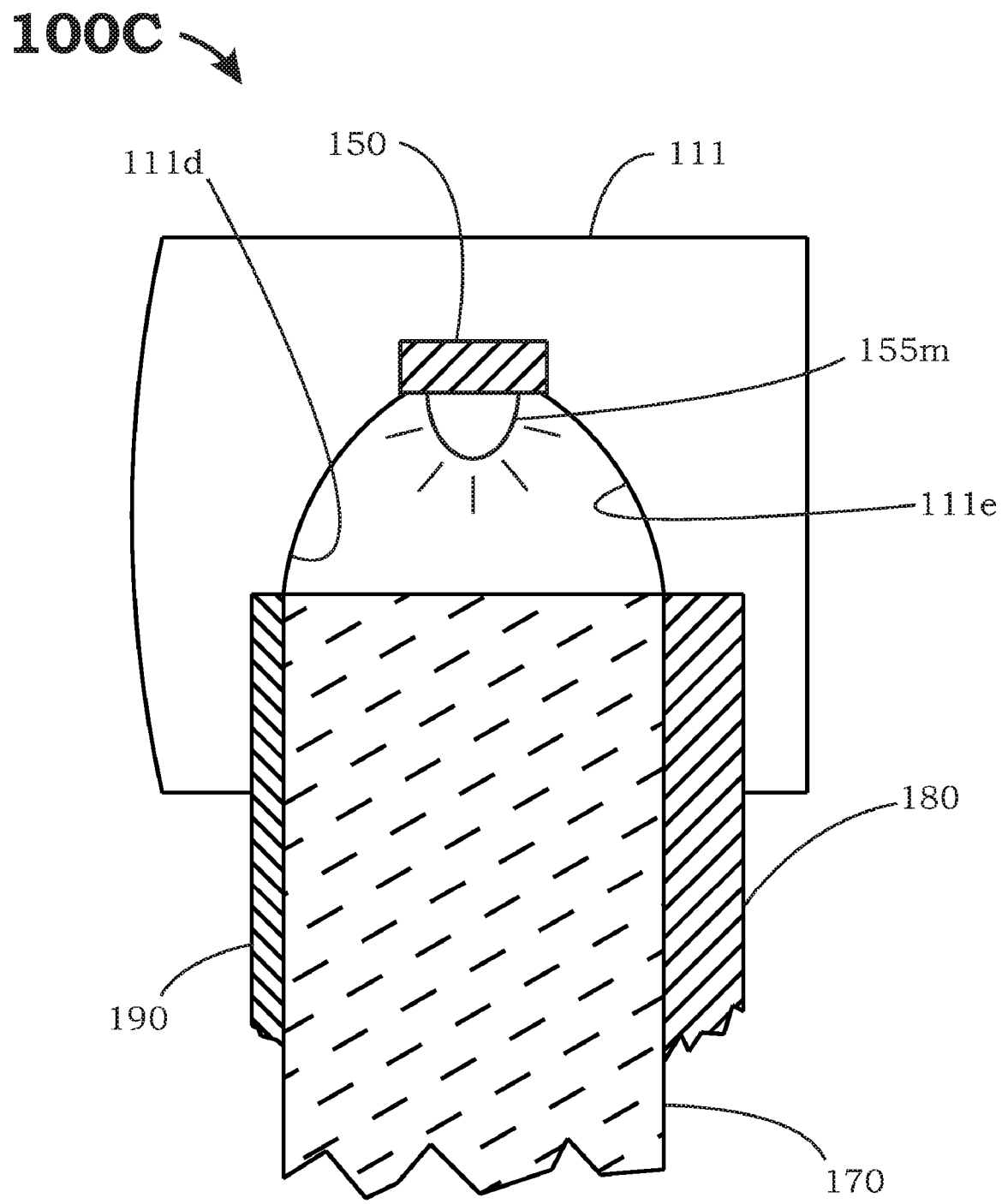
FIG. 1C is a cross-sectional view of a variant of the embodiment of FIG. 1.

The internal reflective characteristics of the frame members of panel 100 can be enhanced by incorporating a suitable frame profile thereby increasing the effectiveness of the illumination produced by LED 155m. For example, as shown in FIG. 1C, frame member 111 has parabolic surfaces 111d, 111e to better focus the light from LED 155m into diffusion layer 170.

The internal reflective characteristics of frame member 110 and frame member 111 can be further enhanced by incorporating a suitable surface polish to inner surfaces 110a, 110b, 110c and surfaces 111d, 111e, respectively. It is also possible to apply a reflective layer in the form of coating or chemical processing including painting, electro-plating or anodizing to the inner surfaces 110a, 110b, 110c, 110d, 111e. Light base 150 can be recessed into frame member 111 to better position LED 155m relative to parabolic surfaces 111d, 111e so that more light can be reflected into diffusion layer 170.

In order to minimize the saw-tooth problem due to the increased LED spacing, surface 175 of diffusion layer 170 has a surface roughness designed to diffuse the light emitted by LEDs 155a, 155b, 155c . . . 155y as the light enters diffusion layer 170. Since diffusion layer 170 can be cut to the appropriate size using several well known techniques such as band saws and circular saws, by leaving surface 175 unpolished with saw cut marks intact or by sanding using grit #2000 or lower, ensuring that the light entering diffusion layer 170 is sufficiently diffused to mitigate the saw-tooth problem.

Other modifications to the illuminated panels of the present invention are also possible. For example, the front portion of frame member 110 can be hinged so that transparency 190 can be easily replaced and also to provide easy access to light sources 155a, 155b, 155c . . . 155y.

Figure 2:
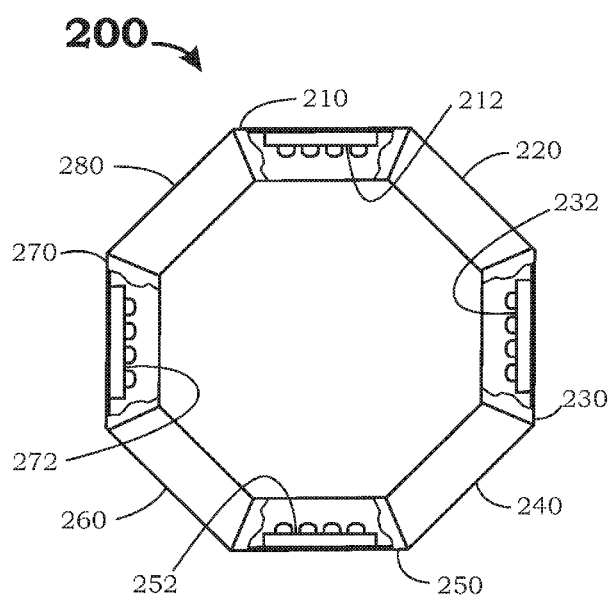
FIG. 2 is a front view of another variant of the embodiment of FIG. 1.
Figure 3:
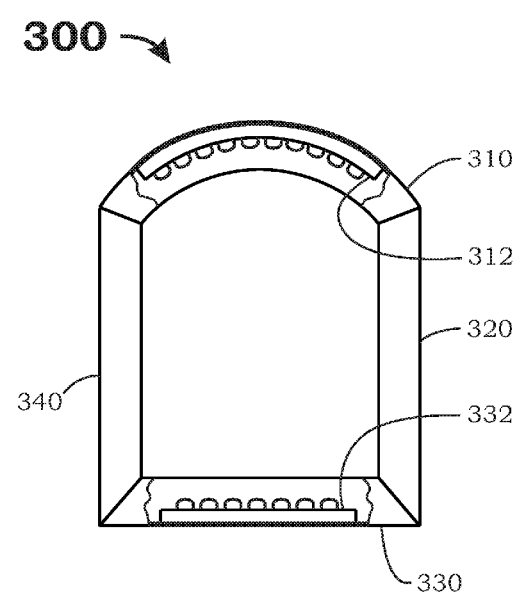
FIG. 3 is a front view of yet another variant of the embodiment of FIG. 1.

Another advantage of using point light sources is the increased variety of potential panel shapes. FIG. 2 is a cutaway front view of an octagonal panel 200 which includes frame members 210, 220, 230, 240, 250, 260, 270, 280, and light bases 212, 232, 252, 272 inside frame members 210, 230, 250, 270, respectively. Similarly, the cutaway front view of FIG. 3 illustrates a semi-circular panel 300 having a curved frame member 310 with curved light base 312, straight frame member 320, straight frame member 330 with straight light base 332, and straight frame member 340.

Referring now to FIG. 4A, a cutaway front view illustrating another embodiment of the present invention, illuminated panel 400 includes frame members 410, 420, 430, 440, with the front portion of top frame member 410 and the front portion of bottom frame member 430 exposed to show a top row of point light sources 455a, 455b, 455c, 455d, 455e and a bottom row of point light sources 465a, 465b, 465c, 465d, 465e, respectively. The top row of point light sources 455a, 455b, 455c, 455d, 455e are mounted on light base 450 which provides structural support and power to light sources 455a, 455b, 455c, 455d, 455e. Similarly, the bottom row of point light sources 465a, 465b, 465c, 465d, 465e are mounted on powered light base 460.

In this embodiment, point light sources 455a, 455b, 455c, 455d, 455e and 465a, 465b, 465c, 465d, 465e can be 3-Watt front-emitting Luxeon LEDs. LEDs 455a, 455b, 455c, 455d, 455e, 465a, 465b, 465c, 465d, 465e are spaced about 1 to 2 inches apart from each other, resulting in approximately 6 Luxeon LEDs per linear foot of their respective light bases 450, 460. In this example, each 3-Watt Luxeon LED emits about 60 lumens of visible light. This arrangement should be sufficient to accomplish sufficient penetration of up to two feet into diffusion layer 470 while maintaining light variation within 20% so that the variation of intensity on the surface of panel 400 is not noticeable to the average human eye.

Suitable front-emitting Luxeon LEDs are commercially available in 1-Watt, 3-Watt, 5-Watt, and other higher wattage LED modules from www.luxeon.com, for example Lumineds Lambertian LXHL PW09 white Luxeon LED. Other commercial sources of higher wattage LEDs include www.edison-opto.com.tw.

Because higher wattage Luxeon LEDs 455a, 455b, 455c, 455d, 455e, 465a, 465b, 465c, 465d, 465e generate a significant amount of heat, light bases 450, 460 also function as heat sinks for Luxeon LEDs 455a, 455b, 455c, 455d, 455e and 465a, 465b, 465c, 465d, 465e, respectively. Light bases 450, 460 in turn conduct heat to their respective frame members 410, 430.

Luxeon LEDs 455a, 455b, 455c, 455d, 455e, 465a, 465b, 465c, 465d, 465e can be powered and controlled using a constant-current power supply, such as the AED Series 36-100 Watt power supply available from www.xppower.com.

FIG. 4B is a cross-sectional view 4B-4B of panel 400 showing top frame member 410, light source 455c attached to light base 450, and an illuminated display comprising a transparency 490, a diffusion layer 470 and a back-scattering layer 480. Because brighter Luxeon LEDs 455a, 455b, 455c, 455d, 455e and 465a, 465b, 465c, 465d, 465e can be spaced further apart from each other than lower power point light sources, the saw-tooth problem associated with all point light sources is more pronounced. In accordance with one aspect of the invention, surface 475 of diffusion layer 470 has a suitable surface roughness of approximately 2000 grit and courser in order to diffuse the light emitted by LEDs 455a, 455b, 455c, 455d, 455e as the light enters diffusion layer 470. This surface roughness can be accomplished by for example by cutting with a saw having about 80-100 teeth per inch.

In addition to being reflective, the inner surfaces 410a, 410b, 410c of frame member 410 can also be made to diffusively reflect light emitted by LEDs 455a, 455b, 455c, 455d, 455e by, for example, incorporating small dimples into reflective surfaces 410a, 410b, 410c.

Figure 5A:
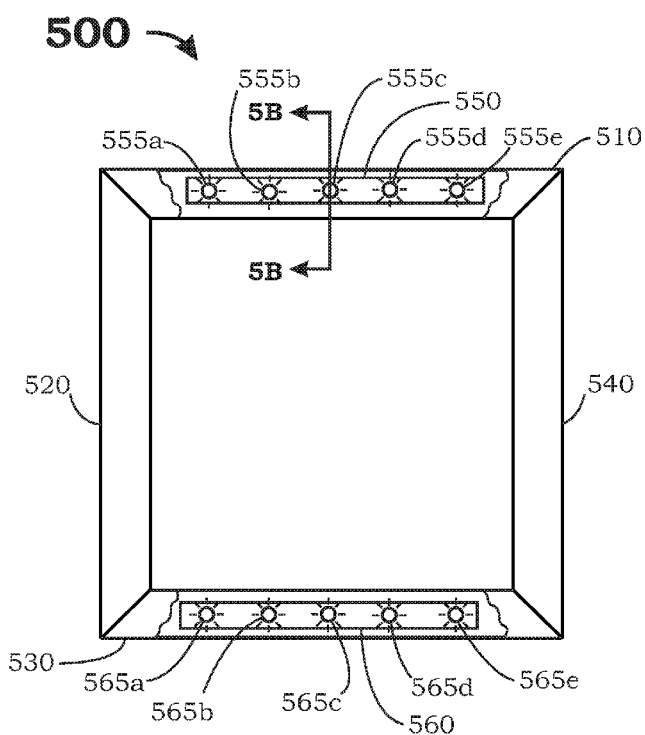
FIG. 5A is a front view of yet another embodiment of the invention.

FIG. 5A is a cutaway front view showing yet another embodiment of the invention. An illuminated panel 500 includes frame members 510, 520, 530, 540, with the front portion of top frame member 510 and the front portion of bottom frame member 530 exposed to show a top row of point light sources 555a, 555b, 555c, 555d, 555e and a bottom row of point light sources 565a, 565b, 565c, 565d, 565e, respectively. The top row of point light sources 555a, 555b, 555c, 555d, 555e are mounted on light base 550 which provides structural support and power to light sources 555a, 555b, 555c, 555d, 555e. Similarly, the bottom row of point light sources 565a, 565b, 565c, 565d, 565e are mounted on powered light base 560.

Side-emitting Luxeon LEDs are commercially available in 1-Watt, 3-Watt, 5-Watt, and other higher wattage modules from www.luxeon.com. Because higher wattage Luxeon LEDs 555a, 555b, 555c, 555d, 555e, 565a, 565b, 565c, 565d, 565e generate a significant amount of heat, light bases 350, 360 also dissipate heat from LEDs 555a, 555b, 555c, 555d, 555e and 565a, 565b, 565c, 565d, 565e to frame members 510, 530, respectively. Light bases 550, 560 in turn conduct heat to their respective frame members 510, 530. Power and control circuitry for panel 500 is similar to that described above for panel 400.

Figure 5B:
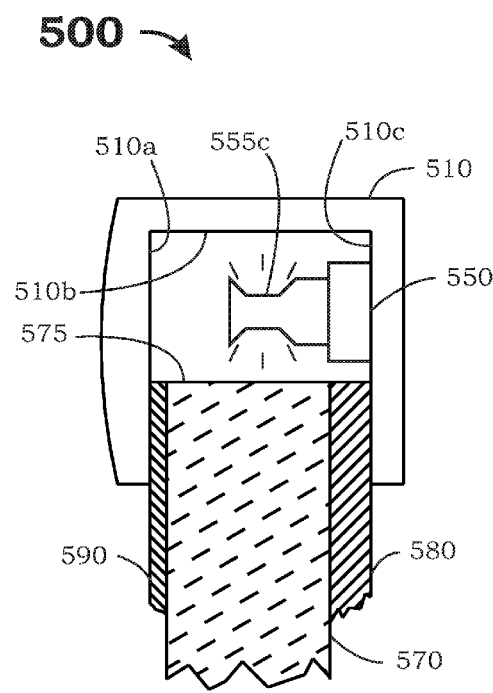
FIG. 5B is a cross-sectional view 5B-5B of FIG. 5A.

FIG. 5B is a cross-sectional view 5B-5B of panel 500 showing top frame member 510, light source 555c attached to light base 550, and an illuminated display comprising a transparency 590, a diffusion layer 570 and a back-scattering layer 580. In this embodiment, point light sources 555a, 555b, 555c, 555d, 555e, 565a, 565b, 565c, 565d, 565e can be 3-Watt side-emitting Luxeon LEDs. Accordingly, LEDs 555a, 555b, 555c, 555d, 555e, 565a, 565b, 565c, 565d, 565e are oriented so the light is emitted substantially in the same plane as diffusion layer 570.

The higher wattage Luxeon LEDs 555a, 555b, 555c, 555d, 555e, 565a, 565b, 565c, 565d, 565e of panel 300 are spaced about 1 to 2 inches apart from each other, resulting in approximately 6 LEDs per linear foot of their respective light bases 550, 560. In this example, each 3-Watt Luxeon LED emits about 60 lumens of visible light. Suitable side-emitting Luxeon LEDs are commercially available from www.luxeon.com such as the Lumineds LXHL DW09 white LED.

As discussed above, in order to minimize the saw-tooth problem due to the increased LED spacing, surface 575 of diffusion layer 570 has a suitable surface roughness designed to diffuse the light emitted by LEDs 555a, 555b, 555c, 555d, 555e as the light enters diffusion layer 570. This surface roughness can be accomplished by for example a sand-blasting medium that can penetrate surface 570a using multiple blasting heads to cause a varied density pattern thereby enabling panel 500 to output a more even light intensity.

In this embodiment, because a significant amount of light from LEDs 555a, 555b, 555c, 555d, 555e is initially emitted in a direction away from diffusion layer 570, the inner surfaces 510a, 510b, 510c of frame member 510 should be designed to efficiently and diffusively reflect light emitted by LEDs 555a, 555b, 555c, 555d, 555e toward surface 575 of diffusion layer 570. Techniques such as profiling, polishing and dimpling of reflective surface 510a, 510b, 510c described above can be employed to better utilize the higher order indirect light emitted by LEDs 555a, 555b, 555c, 555d, 555e.

Figure 6A:
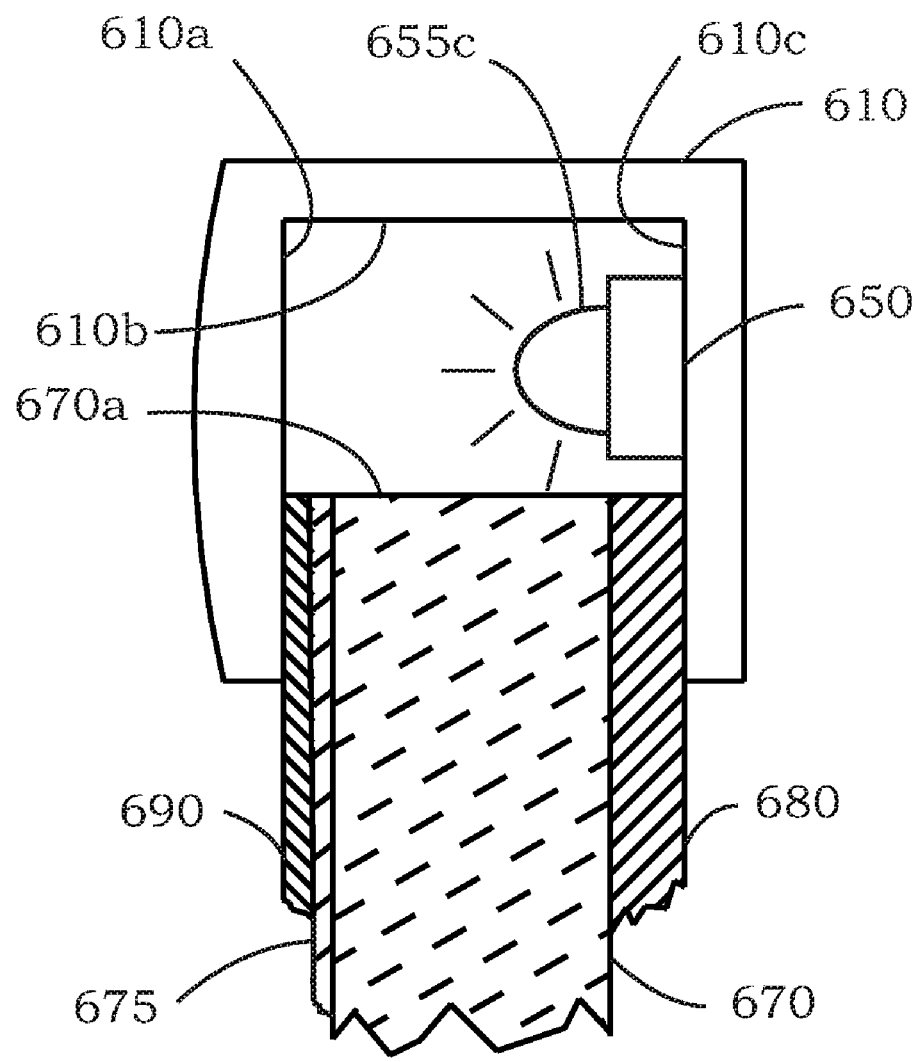
FIGS. 6A-6C are cross-sectional views illustrating several variants of an illuminated display for the embodiments of FIGS. 4A and 5A.
Figure 6B:
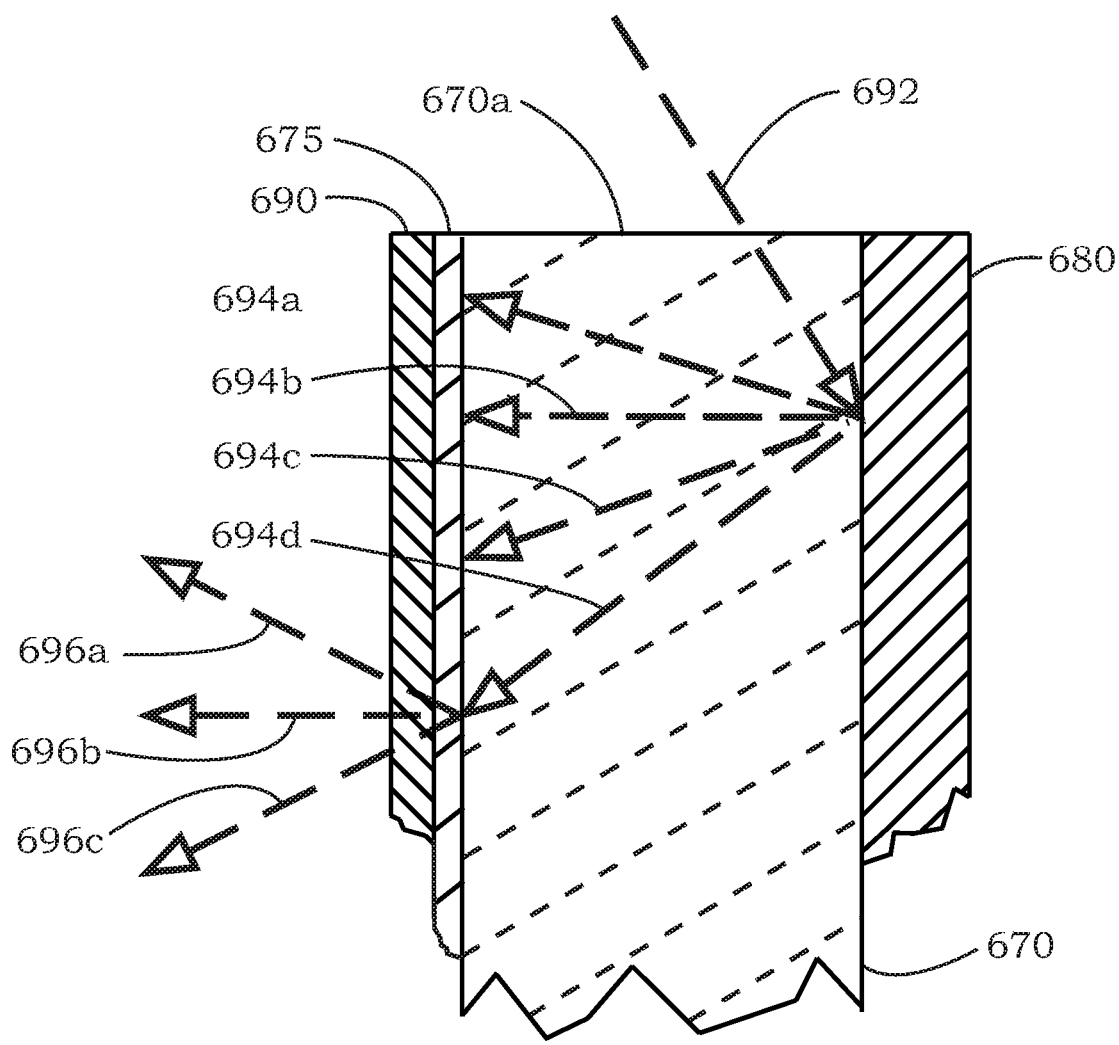

Hence in accordance with another aspect of the invention as illustrated by the cross-sectional views FIGS. 6A and 6B of display panel 600, a dispersion layer 675 is positioned in front of diffusion layer 670. The inclusion of dispersion layer 675 improves the overall light transmission efficiency of panel 600 by increasing the transmission of higher-order light rays from point light source 655c and also from additional point light sources (not shown) inside frame member 610, through diffusion layer 670, dispersion layer 675 and transparency 690. Note that light source 655c can be attached to frame member 610 via any of surfaces 610a, 610b, 610c.

In this embodiment, backscattering layer 680 is approximately several microns to about 3 mm in thickness, and should be opaque, and diffusive with high reflectance, preferably over 90%. Suitable materials for back-scattering layer 680 include aluminum oxide and titanium oxide, any suitable rare earth coating, or a highly reflective diffusive plastic sheet.

Diffusion layer 670 can be about 5 to 10 mm thick and should be as optically transparent as possible. Ideally, diffusion layer 670 should not have scattering materials impregnated since that will cause absorption of the light. In addition, surface 670a of diffusion layer 670 should be roughened in the manner described above in order to minimize the saw-tooth effect.

Dispersion layer 675 can be about 3 to 10 microns with mode optical scattering properties. Layer 675 can be a lower index layer relative to diffusion layer 670. In addition, dispersion layer 675 may have a scattering medium that has a different refractive index impregnated to provide even scattering relative to the total area of panel 600.

Both layers 670 and 675 can be made of a suitable acrylic material, e.g. polymethamethacrylate. In this example, layer 670 has a refractive index N of about 1.47 to 1.49 and layer 675 has a refractive index N of about 1.33 to 1.35.

Referring to both FIGS. 6A and 6B, an exemplary higher-order light ray 692 from light source 655c enters surface 670a and is reflected in a scattered pattern by backscattering layer 680 into rays 694a, 694b, 694c, 694d directed towards dispersion layer 675. Note that reflected ray 694d arrives at steeper angle at dispersion layer 675 than rays 694a, 694b, 694c, and hence ray 694d is further scattered by dispersion layer 675 as rays 696a, 696b and 696c through transparency 690. In this example, although ray 694d is reflected off backscattering layer 680, ray 694d can also depict similarly-angled rays directly generated by light source 655c. Ideally, light transmission at the interface between diffusion layer 670 and dispersion layer 675 should be greater than 90% with minimal Fresnel losses.

Further, in order to minimize variation of light intensity over panel 600, a variable pattern of reflectance can be incorporated into the back surface of layer diffusion layer 670 so that the reflectance increases in a direction away from LED 655c.

The resulting multi-layer sandwich comprising of dispersion layer 675, diffusion layer 670 and backscattering layer 680 can be manufactured using a cast layering process, an enclosed liquid polymerization extrusion process, or a combination thereof, using techniques known to one skilled in the plastics manufacturing arts. Alternatively, backscattering layer 680 be evaporated on, bonded to or attached to the back surface of diffusion layer 670 with a suitable adhesive.

Many modifications and variations are possible. For example, panels 100, 200, 300, 400, 500 and 600 can be dimmable by adding a variable current control circuitry. An infrared red sensor can also be added to the control circuitry of panels 100, 200, 300, 400, 500 and 600, so that the panels are triggered when a potential customer enters the detection field thereby dimming or turning on and off in an appropriate manner.

Figure 6C:
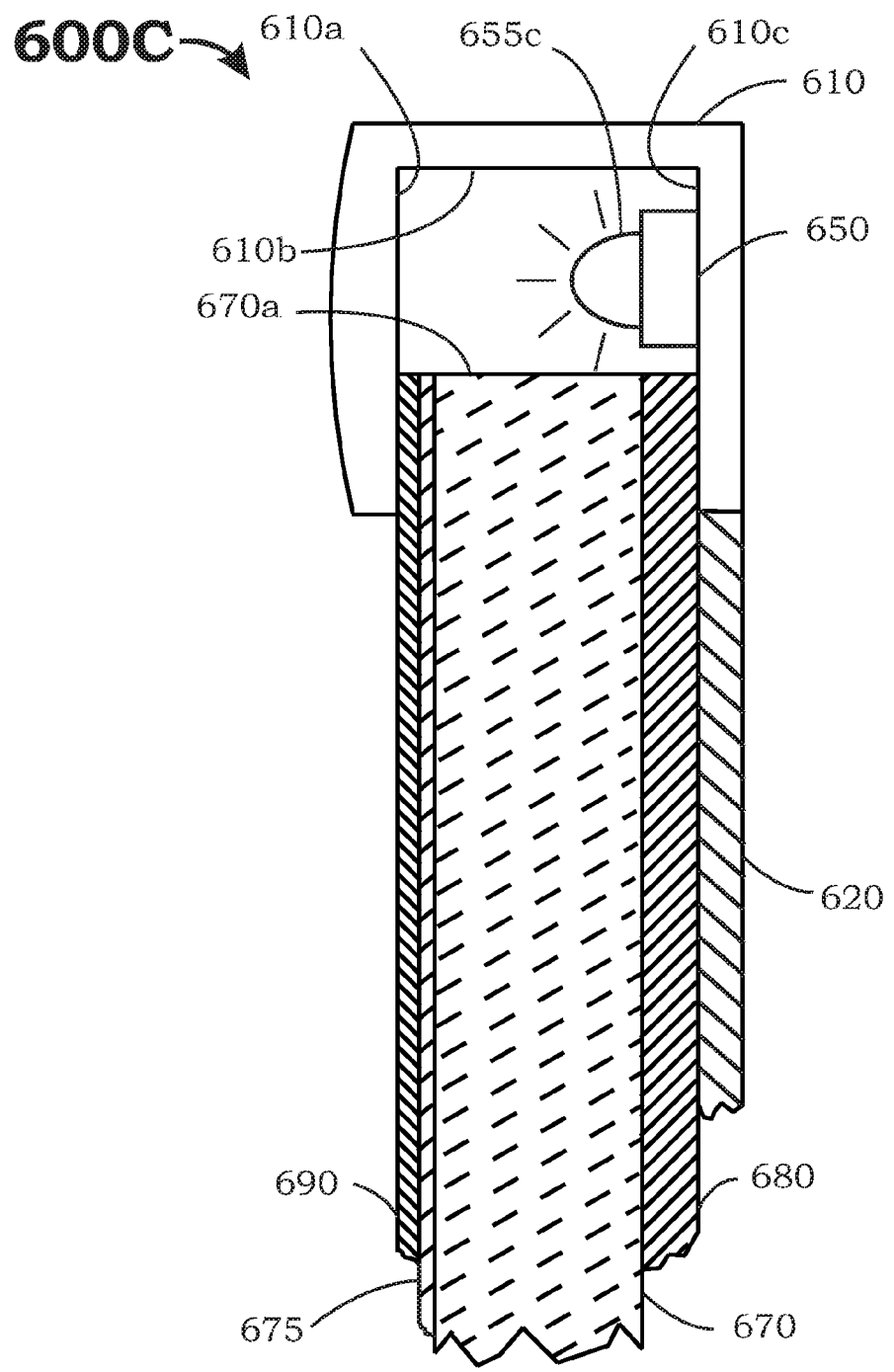

In some applications as illustrated by embodiment 600C of FIG 6C, in addition to the edge lights described in the above embodiments, panels 100, 200, 300, 400, 500, 600 can also be back-lighted by additional light source(s) 620. Accordingly, dispersion layers and/or backscattering layers, e.g., layers 670, 680, can be opaque in order to diffuse the back lighting.

Further, since white LEDs are not the most efficient emitter of light, it is also possible for LED 655c to transmit light in the substantially blue-to-ultraviolet range into diffusion layer 670, to include phosphors in dispersion layer 675 or backscattering layer 680 or combinations thereof, and to convert the blue-to-ultraviolet light into white light or any colored light within the visible spectrum.

Other modifications and variations are also possible. For example, other higher intensity point light sources for illuminating panels 400, 500 include high intensity discharge (HID) lights and halogen lights. The present invention will also improve the quality and quantity of light transmitted by other non-point light sources such as neon and fluorescent light sources.

In the above described embodiments, frame members of panels 100, 200, 300, 400, 500 and 600 can be manufactured from aluminum extrusions. The use of any other suitable rigid framing materials including other metals, alloys, plastics and composites such as steel, bronze, wood, polycarbonate, carbon-fiber, and fiberglass is also possible.

In sum, the present invention provides an improved illuminator using light sources such as LEDs for evenly illuminating panels that is easy to manufacturer, easy to maintain, shock resistant, impact resistant, portable, cost effective, and have long lamp-life, while minimizing the "saw-tooth" effect in the emitted light pattern.

While the present invention has been described with reference to particular embodiments, it will be understood that the embodiments are illustrative and that the inventive scope is not so limited. In addition, the various features of the present invention can be practiced alone or in combination. Alternative embodiments of the present invention will also become apparent to those having ordinary skill in the art to which the present invention pertains. Such alternate embodiments are considered to be encompassed within the spirit and scope of the present invention. Accordingly, the scope of the present invention is described by the appended claims and is supported by the foregoing description.

What is claimed is:

1. An illuminated panel comprising:
   a panel frame having at least one illuminated frame member;
   at least one row of point light sources located substantially within the at least one illuminated frame member wherein the at least one row of point light sources are configured to emit light in a substantially blue to ultraviolet range;
   a diffusion layer have a diffusion edge facing the at least one row of point light sources, and wherein the diffusion edge has a surface roughness configured to diffuse light emitted by the at least one row of point light sources; and
   a dispersion layer coupled to a front surface of the diffusion layer wherein the dispersion layer includes a phosphor for converting the emitted light into visible light.

2. The illuminated panel of claim 1 further comprising a backscattering layer coupled to a back surface of the diffusion layer.

3. The illuminated panel of claim 1 wherein a back surface of the diffusion layer has a variable reflectance.

4. The illuminated panel of claim 1 wherein the point light sources are light emitting diodes.

5. The illuminated panel of claim 4 wherein the light emitting diodes are higher wattage diodes.

6. The illuminated panel of claim 1 wherein the point light sources are dimmable.

7. The illuminated panel of claim 1 wherein the point light sources are activated by a sensor.

8. The illuminated panel of claim 1 wherein the at least one illuminated frame member functions as a heat sink for the point light sources.

9. The illuminated panel of claim 1 wherein the diffusion layer is optically clear.

10. The illuminated panel of claim 1 wherein the diffusion layer is optically opaque.

11. An illuminated panel comprising:
    a panel frame having at least one illuminated frame member;
    at least one row of point light sources located substantially within the at least one illuminated frame member;
    a diffusion layer have a diffusion edge facing the at least one row of point light sources, and wherein the diffusion edge has a surface roughness configured to diffuse light emitted by the at least one row of point light sources;
    a dispersion layer coupled to a front surface of the diffusion layer; and
    an at least one backlighting source behind a back surface of the diffusion layer.

12. The illuminated panel of claim 11 further comprising a backscattering layer coupled to a back surface of the diffusion layer.

13. The illuminated panel of claim 11 wherein a back surface of the diffusion layer has a variable reflectance.

14. The illuminated panel of claim 11 wherein the point light sources are light emitting diodes.

15. The illuminated panel of claim 14 wherein the light emitting diodes are higher wattage diodes.

16. The illuminated panel of claim 11 wherein the point light sources are dimmable.

17. The illuminated panel of claim 11 wherein the point light sources are activated by a sensor.

18. The illuminated panel of claim 11 wherein the at least one illuminated frame member functions as a heat sink for the point light sources.

19. The illuminated panel of claim 11 wherein the diffusion layer is optically clear.

20. The illuminated panel of claim 11 wherein the diffusion layer is optically opaque.

* * * * *